T. LEWIS AND F. C. SCRIMGER.
INDICATOR.
APPLICATION FILED APR. 27, 1920.
1,390,570.
Patented Sept. 13, 1921.
2 SHEETS—SHEET 1.
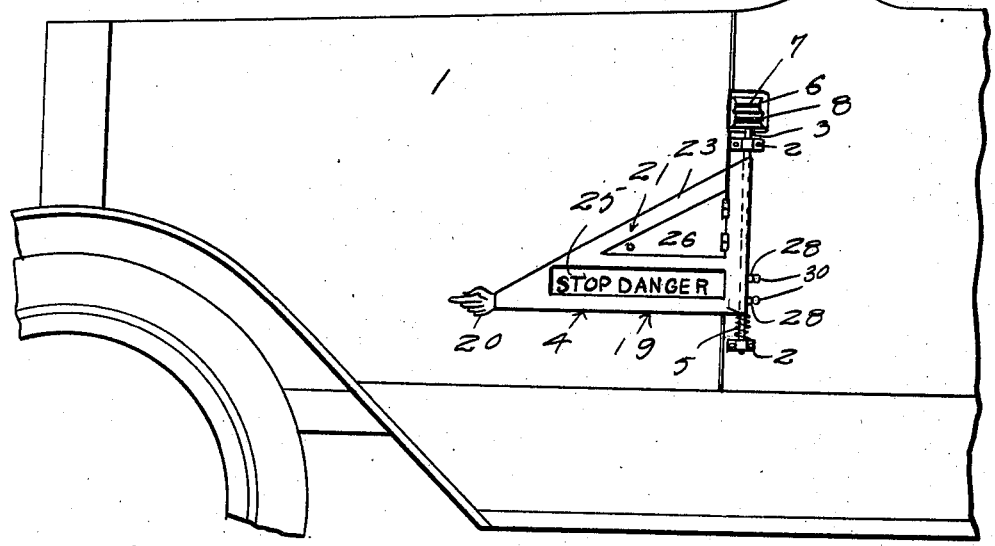
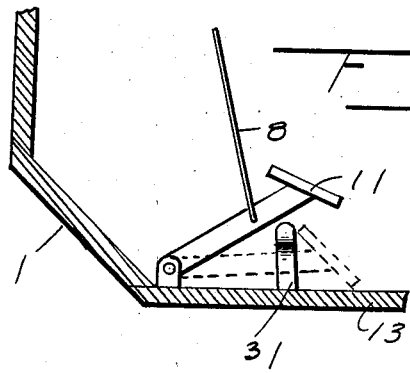
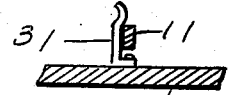
INVENTOR.
T. Lewis
F. C. Scrimger
BY
ATTORNEY.

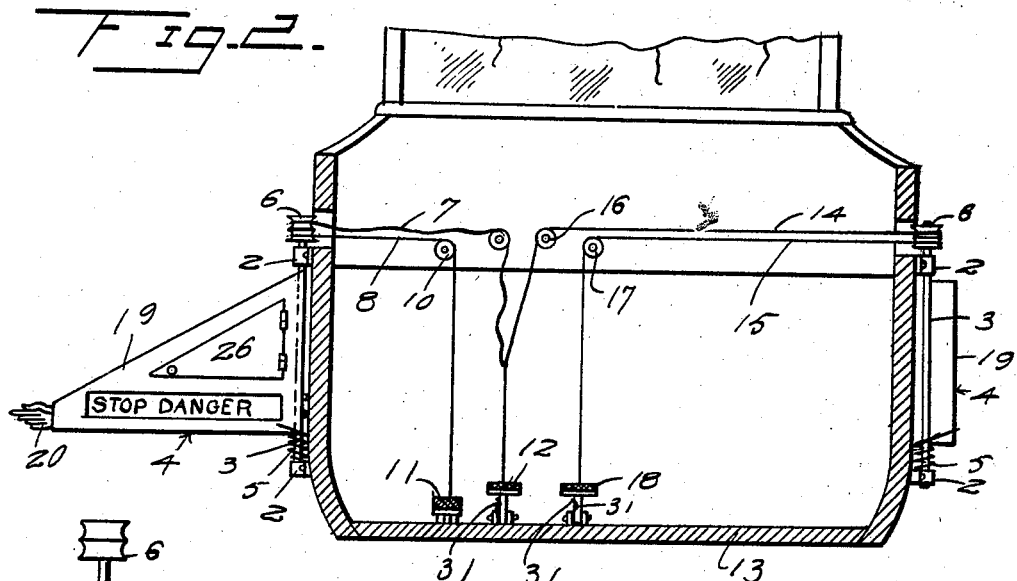
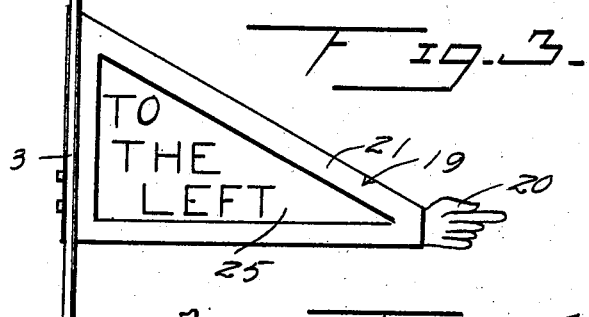
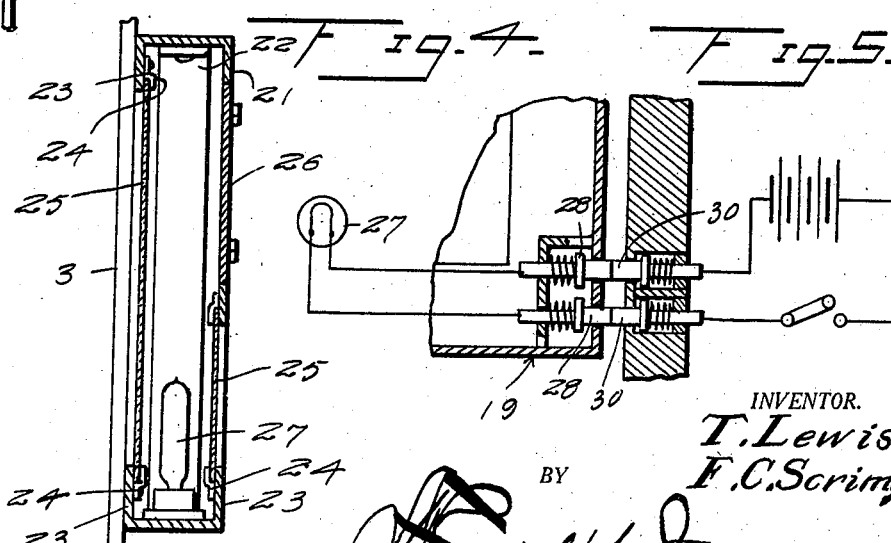

UNITED STATES PATENT OFFICE.

THOMAS LEWIS AND FRANKLIN C. SCRIMGER, OF PONTIAC, MICHIGAN.

INDICATOR.

1,390,570.　　　　　Specification of Letters Patent.　　Patented Sept. 13, 1921.

Application filed April 27, 1920. Serial No. 376,895.

*To all whom it may concern:*

Be it known that we, THOMAS LEWIS and FRANKLIN C. SCRIMGER, citizens of the United States, residing at Pontiac, in the county of Oakland and State of Michigan, have invented certain new and useful Improvements in Indicators; and we do hereby declare the following to be a full, clear, and exact description of the invention, such as will enable others skilled in the art to which it appertains to make and use the same.

This invention relates to new and useful improvements in direction indicators, and has for its primary object the provision of signals journaled to the sides of an automobile and connected to the operating means located in convenient reach of the operator so that said signals may be easily and quickly swung laterally of said automobile or into signaling position either simultaneously or one at a time, so that traffic in the vicinity of the automobile will be informed of a turn from a straight course, and also a warning to stop is given to the following traffic thereby obviating numerous accidents caused by warnings not being given prior to making a turn or stop by an automobile.

Another object of this invention is the provision of a direction indicator of the above stated character which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which:

Figure 1 is a fragmentary side elevation, illustrating an automobile with a direction indicator applied thereto and constructed in accordance with our invention.

Fig. 2 is a fragmentary transverse sectional view illustrating the operating means associated with the automobile, Fig. 3 is an enlarged side elevation of one of the signals, Fig. 4 is a longitudinal sectional view illustrating the same, Fig. 5 is a detailed sectional view illustrating contacts for completing circuits to the illuminating means of the signals, Fig. 6 is an enlarged detailed view illustrating a foot pedal and catch therefor for operating the signal.

Fig. 7 is a detail sectional view illustrating a spring catch.

Referring in detail to the drawings, the numeral 1 indicates as an entirety an automobile which has secured to each side thereof pairs of brackets 2 for rotatably supporting shafts 3 to which are secured signals 4. The normal position of the signals 4 is parallel with the sides of the automobile so that they are not readily noticeable and do not mar the appearance of the automobile and are maintained and returned to said position by means of springs 5 which are mounted on the shafts 3 and secured at one of their ends to one of the brackets, and their other ends secured to said shafts. Double drums 6 are secured to the upper ends of the shafts 3 and one of said drums has cables 7 and 8 secured thereto and wound thereon, and said cables extend through one side of the automobile and over pulleys 9 and 10 respectively, which are secured to the instrument board 10' of the automobile and pass downwardly from said pulleys and are secured to the foot pedals 11 and 12 pivotally mounted on the floor board 13 of the automobile and in convenient reach of the operator so that upon actuation of either of said foot pedals the respective signal will be swung to a position at right-angles to the car and in clear view of approaching traffic. The other drum 6 has secured thereto and wound thereon cables 14 and 15 which extend through the other side of the automobile and over pulleys 16 and 17 secured to the instrument board 10' and the cable 14 is connected to the cables 7, while the cable 15 extends downwardly from the pulley 17 and is secured to a foot pedal 18 pivotally mounted on the foot board adjacent the pedal 11 so that upon operation of either the foot pedal 18 or 11 the other signal will be swung to a position at right-angles to the automobile. From the foregoing description it will be seen that the pedals 12 and 18 will operate the signals one at a time, while the pedal 11 will move the signals into signaling position simultaneously which would be done in case of an emergency.

The signal on the right-hand side of the automobile has the characters "To the right" applied to the front face thereof, and said signal is adapted to be actuated by the pedal 18 to indicate a turn to the right and the rear face of said signal bears the characters "Stop Danger," which is readable by the traffic following the respective automobile so as to warn the same in sufficient time to prevent rear end collisions.

The signal on the left-hand side of the automobile has the characters "To the left" on its front face and is actuated into signaling position by the pedal 12 for indicating a turn to the left and said signal carries the characters "Stop Danger" on its rear face so that the following traffic will be warned when said signal moves into signaling position.

The signals are identical in construction and reference to one is thought to be sufficient for both.

The signal consists of a casing 19 of a substantially triangular shape having its bight portion secured to the shaft while its apex has formed thereon an indicator 20 in the form of a hand. The casing 19 includes a skeleton frame 21 constructed of channel iron which is strengthened and reinforced by braces 22. The side flanges 23 of said frame have cleats or brackets 24 secured thereto for supporting celluloid panels 25 on which the characters heretofore mentioned are applied. The rear flange of the upper channel member 21 is of a greater width than the front flange so that a smaller space to be closed by the rear panel 25 is provided and said flange is provided with a door-way closed by a hinged door 26 so that a person may gain access to the interior of the casing for the purpose of placing and removing electric lamps 27 arranged in said casing. The electric lamps 27 are electrically connected to the spring actuated contacts 28 carried by the bight portion of the casing 19 and which are adapted to engage spring pressed contacts 30 carried by the side of the automobile when said signal is moved in signaling position or at right-angles to the automobile. The contacts 30 are electrically connected with an electrical source on the automobile, and a switch may be provided between said source and the contacts for rendering the illuminating means inoperative and in some instances this is desirable when operating the automobile and the signals in the day-time. Spring catches 31 are carried by the automobile adjacent the foot pedals, and are adapted to engage said foot pedals when depressed for holding the signals in signaling position, leaving the operator free to use the feet for controlling the automobile when making a stop or turn.

While we have shown and described the preferred embodiment of our invention it is to be understood that minor changes in construction, combination, and arrangement of parts may be made without departing from the spirit and scope of the invention as claimed.

Having thus described our invention what we claim is:

1. An indicator comprising a vertical rotatable shaft, a substantially triangular shaped frame having its bight portion to the shaft, marginal flanges formed on said frame and one flange being of width greater than the others and provided with a doorway, a door for said doorway, character bearing panels secured to the flanges and closing the spaces formed by said flanges and means for imparting movement to the shaft.

2. An indicator comprising vertical shafts journaled to the sides of an automobile, signals secured to the shafts, tensioned means for urging the signals parallel with the sides of the automobile, double drums secured to the shafts, pairs of cables secured to and wound on the drums and one cable of each pair connected with each other, and end and intermediate pivotally mounted foot pedals connected to the other cables and to the connected cables.

In testimony whereof we affix our signatures in presence of two witnesses.

THOMAS LEWIS.
FRANKLIN C. SCRIMGER.

Witnesses:
 CLYDE ELWELL,
 THOMAS WILLIAM THOMAS.